United States Patent [19]

Yokobori et al.

[11] Patent Number: 5,231,513
[45] Date of Patent: Jul. 27, 1993

[54] IMAGE FORMING APPARATUS

[75] Inventors: Jun Yokobori; Takashi Murahashi; Masashi Sugano; Hiroyuki Maruyama, all of Tokyo, Japan

[73] Assignee: Konica Corporation, Tokyo, Japan

[21] Appl. No.: 556,388

[22] Filed: Jul. 24, 1990

[30] Foreign Application Priority Data

Jul. 27, 1989 [JP] Japan .................................. 1-196119

[51] Int. Cl.[5] .............................................. H04N 1/00
[52] U.S. Cl. ............................... 358/401; 358/461; 358/486; 358/494; 358/496; 358/497
[58] Field of Search ............... 358/461, 464, 497, 494, 358/401, 498, 486, 496

[56] References Cited

U.S. PATENT DOCUMENTS

| | | | |
|---|---|---|---|
| 4,429,333 | 1/1984 | Davis et al. | 358/496 |
| 4,743,974 | 5/1988 | Lockwood | 358/496 |
| 4,774,591 | 9/1988 | Matsunawa et al. | 358/461 |
| 4,866,536 | 9/1989 | Honjo et al. | 358/486 |
| 4,937,662 | 6/1990 | Matsunawa et al. | 358/461 |

FOREIGN PATENT DOCUMENTS 63-10882 1/1988 Japan .

Primary Examiner—Jin F. Ng
Assistant Examiner—Edward Lefkowitz
Attorney, Agent, or Firm—Finnegan, Henderson, Farabow, Garrett & Dunner

[57] ABSTRACT

A photoelectric copier for reproducing an image of a document onto a recording sheet, comprising a document supporter, a conveyer for conveying the document onto the document supporter, a scanner for scanning the document on the document supporter and generating an image signal, and an image determiner for determining a density and a color of the image according to the image signal, wherein the scanner is positioned at a predetermined location in a conveyance path of the document before the document is conveyed onto the document supporter and a first scanning, wherein the image is scanned by the scanner while the scanner is stayed at the predetermined location and the document is conveyed onto the document supporter, is executed so that the density and the color are determined by the image determiner according to the image signal.

5 Claims, 2 Drawing Sheets

F I G. 1
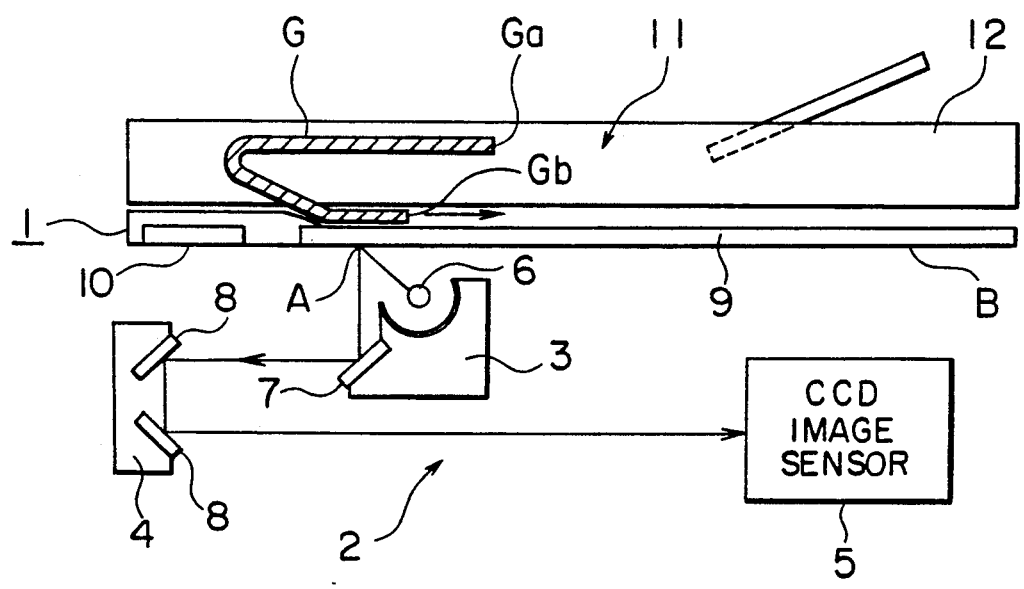

IMAGE FORMING APPARATUS

BACKGROUND OF THE INVENTION

The present invention relates to an image forming apparatus such as, for example, an electrophotographic color copying machine.

As an image forming apparatus of the type mentioned above, there has been known an image forming apparatus equipped with an document feeder that feeds a document onto a platen and having functions wherein preliminary scanning for reading the document by means of a document reader is performed after the document is set to the predetermined position on the platen and before the main scanning for copying is made, and thereby recognizing the color of the document automatically and thereby selecting the mode matching the recognized color automatically and/or recognizing the density of the document automatically and thus adjusting the copy density automatically.

Such a conventional apparatus, however, has a disadvantage that the time required for making one copy is longer by the time required for one preliminary scanning.

An object of the invention is to provide a highly efficient image forming apparatus wherein aforesaid problem has been solved.

SUMMARY OF THE INVENTION

An image forming apparatus of the invention comprising a document-feeding means that feeds a document onto a platen, a document-reading means having a document-reading carriage that travels beneath the document in order to read the document for copying and a means for recognizing the color and density of the document based upon information of the document read by the document-reading means. Before the document is completed to be fed onto the platen by the document-feeding means, the document-reading carriage is moved, to the document-reading position, where the document-reading carriage can read the document while it is being fed onto the platen for the recognition of the color and density of the document.

It is desirable that the document-reading position mentioned above, is a position in the area of the leading edge side of the on the document platen.

It is further desirable that an image forming apparatus has a model, which the document-reading carriage returns to its document-reading position mentioned above, for example near of the leading edge side of the platen after completion of the scanning for copying.

The document is fed onto the platen by the document-feeding means in the method wherein the document is moved backward, passing through the position for the leading edge of the document on the platen, with its trailing edge looking ahead so that the leading edge of the document may be located at the position for the leading edge of the document on the platen and the trailing edge of the document is positioned in the rear side thereof finally when the document is completed to be fed to the predetermined position on the platen.

Owing to the document-reading for recognizing the color and density of the document that is made while the document is being set on the platen, the extra scanning for the recognition of the color and/or density of the document is not necessary and the scanning for copying can be started immediately after the document is set to the predetermined position.

When aforesaid document-reading position is in accordance with a position for the leading edge of the document on the platen, almost all portions of the document pass through the position for the leading edge of the document on the platen and thereby almost all of the information on the document can be read while it is passing.

In the case that there exists the mode wherein a document-reading carriage returns to its document-reading position mentioned above when the scanning for copying is completed, the next document can be read at the document-reading position without any actions to be taken.

BRIEF DESCRIPTION OF THE DRAWINGS

FIG. 1 is a schematic longitudinal sectional view of the primary portions in an electrophotographic color copying machine showing an example of the invention and FIG. 2 is a flowchart showing actions of the copying machine.

DETAILED DESCRIPTION OF THE PREFERRED EMBODIMENTS

Figure 2:
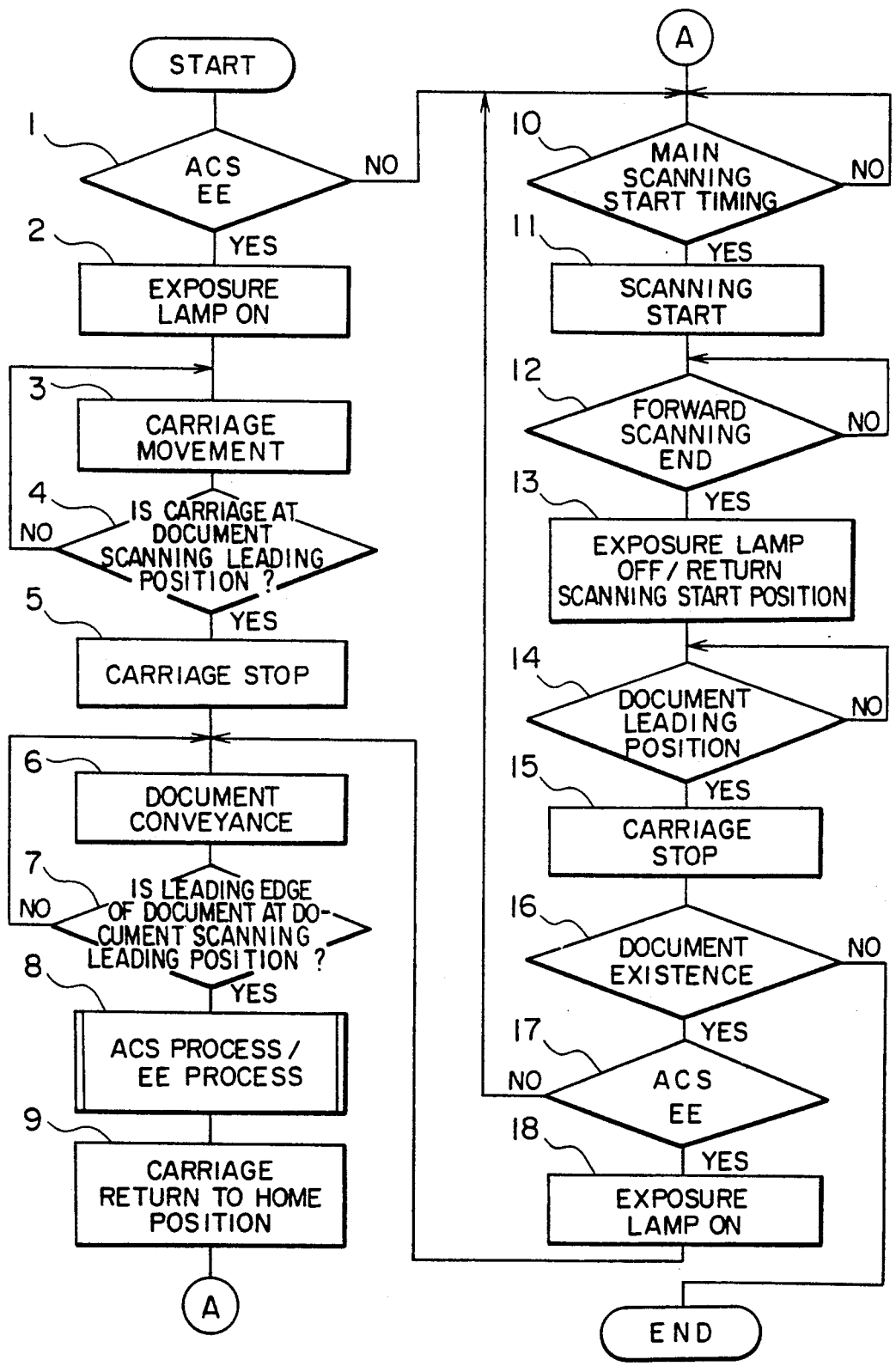

An example wherein the invention is applied to an electrophotographic color copying machine will be explained as follows, referring to the drawings.

FIG. 1 shows a portion of platen 1 of the copying machine under which document-reading means 2 is provided.

Document-reading means 2 scans a document set on platen 1 and converts the images on the document into electrical signals, and it comprises document-reading carriage 3, fixed mirror unit 4, CCD image sensor 5 and others. Document-reading carriage 3 is equipped with exposure lamp 6 and mirror 7, while fixed mirror 4 is equipped with mirror unit 8. The lateral direction in FIG. 1 represents a direction of traveling of document-reading carriage 3, namely a sub-scanning direction (vertical scanning direction), and a direction perpendicular to the drawing plane is a longitudinal direction of image sensor 5, namely a main scanning direction (horizontal scanning direction). In this patent specification, it is to be regarded that the sub-scanning direction is a longitudinal direction, and the scanning by means of document-reading carriage 3 is made when it travels backward from its front side to its back side. Namely, the left side is to be the front and the right side is to be the rear in FIG. 1. Since document-reading means 2 itself is publicly known, the detailed explanation thereof will be omitted.

Platen 1 is provided with transparent glass plate 9, and white reference plate 10 is provided on the under surface of the portion located ahead of glass plate 9 on platen 1. Position A for the leading edge of a document is located in the portion near the front edge of glass plate 9 and position B for the trailing edge of the document of a maximum size is located in the portion near the rear edge of glass plate 9. Cover 12 provided with automatic document feeder 11 is provided over platen 1. Under the condition that cover 12 is closed, automatic document feeder 11 feeds document G onto glass plate 9. Document G is moved with its trailing edge for the main scanning Gb facing ahead on glass plate 9 of platen 1 from the side of position A for the leading edge of a document to the rear side. When document G is then set to the predetermined position on glass plate 9, leading edge for the main scanning Ga of document G is positioned at a point for the leading edge of a document. When the document of a maximum size is used, trailing edge Gb of document G agrees with position B for the trailing edge of the maximum size document on glass plate 9, and for the document smaller than that, trailing edge Gb of document G is positioned between position A for the leading edge of a document and position B for the trailing edge of the maximum size document. Since platen 1 and automatic document feeder 11 are publicly known, the detailed description therefor will be omitted.

Though illustrations are omitted, the copying machine is equipped, in addition to the above, with other items such as an image processing unit that processes an output from image sensor 5 of document-reading means 2 and generates image information, a recording unit that forms images on a photoreceptor drum (image forming means) and transfers them onto an image-transfer paper, an operating unit for setting conditions for the above and a control unit that controls the foregoings. These are also known publicly and the detailed explanation therefor will be omitted accordingly.

The copying machine mentioned above is equipped with an automatic color selecting function (ACS function) in which a document is read by document-reading means 2 in advance of the main scanning for copying, the color of the document is automatically recognized and the mode matching the color is selected automatically, and with an automatic density adjusting function (EE function) that automatically recognizes the density of the document and adjusts the copy density automatically.

Actions of the copying machine mentioned above will be explained as follows, referring to the flowchart in FIG. 2.

Until the copy switch is pressed, document-reading carriage 3 keeps staying at the home position beneath white reference plate 10.

After the copy switch is pressed, the selection of ACS function or EE function is checked in step 1, and when the selection is made, the sequence advances to step 2 wherein exposure lamp 6 on document-reading carriage 3 is lit. Then, in step 3, document-reading carriage 3 is caused to start moving backward from its home position and in step 4, document-reading carriage 3 is checked whether it reaches position A for the leading edge of a document or not. After document-reading carriage 3 arrives at position A for the leading edge of a document, the sequence advances to step 5 where document-reading carriage 3 is stopped. When document-reading carriage 3 stops at position A for the leading edge of a document, the transport of document G by means of automatic document feeder 11 is started in step 6, and then trailing edge Gb of document G is checked whether it reaches position A for the leading edge of a document or not in step 7. This is checked based on the time elapsing from the start of transport of document G, and after trailing edge Gb of document G arrives at position A for the leading edge of a document, the sequence advances to step 8 where ACS processing and EE processing are performed. Namely, while document G is passing through position A for the leading edge of a document with its trailing edge Gb leading the movement of document G, document-reading carriage 3 staying at position A reads document G, and thereby the color and density of document G are recognized based on the information read from document G, thus, the color is selected and the density is adjusted. After the completion of ACS processing and EE processing, document-reading carriage 3 is returned to its home position in step 9.

After document-reading carriage 3 returns to its home position, the sequence advances to the standby in step 10 for waiting until the start timing for main scanning comes, and when it comes to start timing for main scanning, the sequence advances to step 11 where document-reading carriage 3 is caused to move backward from the home position for the start of main scanning. After the main scanning is started, document-reading carriage 3 arrives at trailing edge Gb of document G for checking whether the forward main scanning has been completed or not in step 12. If it has been completed, the sequence advances to step 13 where exposure lamp 6 is put out and then document-reading carriage 3 is started for backward main scanning. After the start of the backward main scanning, document-reading carriage 3 is checked whether it has arrived at position A for the leading edge of a document or not in step 14, and if it has arrived at position A for the leading edge of a document, document-reading carriage 3 is stopped in step 15. After document-reading carriage 3 returns to position A for the leading edge of a document and stops there, document feeder 11 is checked whether it contains residual documents or not in step 16. When residual documents exist, it is checked whether either of ACS function or EE function is selected or not in step 17, and when selected, exposure lamp 6 of document-reading carriage 3 is put out in step 18. Then, the sequence returns to step 6 and processings in and after step 6 are repeated.

When no residual documents are found in document feeder 11 in step 16, the processing is completed.

When neither ACS function nor EE function is found to be selected in step 1, the sequence advances directly to step 10, and when neither ACS function nor EE function is found to be selected in step 17, the sequence goes back to step 10. In both cases, ACS processing, EE processing and document-reading therefor are not performed.

In the example mentioned above, most of information on the document may be read because document-reading carriage 3 is stopped at position A for the leading edge of a document for document-reading. However, there may be another type of document-reading wherein document-reading carriage 3 is stopped at an optional position for reading between position A for the leading edge of a document and position B for the trailing edge of the maximum size document for reading a part of the document.

In the example mentioned above, document-reading carriage 3 is returned to position A for the leading edge of a document after the forward main scanning is completed, which enables the next document to be read without taking any action. However, document-reading carriage 3 may also be returned to another appropriate position such as its home position after the main forward scanning is completed.

In an image forming apparatus of the invention, as stated above, the document-reading for the purpose of recognizing the color and density of the document is made while the document is being fed onto a platen. Therefore, the preliminary scanning for the above is not necessary and it is possible to start the main scanning for copying immediately after the document is set to the predetermined position, resulting in the less necessary time per copy.

When aforesaid document-reading position is set to the position for the leading edge of a document on the platen, it is possible to read almost all of information on the document.

When employing the mode wherein the document-reading carriage returns to aforesaid document-reading position after the main scanning for copying is completed, it is possible to start reading the next document at the same document-reading position.

What is claimed is:

1. An image forming apparatus for reproducing an image of a document onto a recording sheet, comprising:
   means for supporting said document;
   means for conveying said document onto said document supporting means;
   means for scanning said document on said document supporting means and generating an image signal;
   means for positioning the scanning means at a first predetermined location with respect to a conveyance path of said document during a first scanning, the scanning means scanning the document as the document is conveyed onto the document supporting means and generating a first scanning image signal during the first scanning; and
   means for determining a density and a color of said image on the basis of said first scanning image signal.

2. The image forming apparatus of claim 1, further comprising means for moving said scanning means across said document after the first scanning, thereby executing a second scanning so that said image of said document is reproduced onto said recording sheet, wherein said scanning means returns to said first predetermined location after said second scanning.

3. The image forming apparatus of claim 2, wherein said first predetermined location is substantially aligned with an edge of said document at which said second scanning begins.

4. The image forming apparatus of claim 2, wherein said scanning means includes a carriage means for scanning the document with a light beam, said carriage means being located at said first predetermined location as the document is conveyed onto the document supporting means.

5. The image forming apparatus of claim 4, wherein said positioning means includes means for positioning the carriage means at a second predetermined location before said second scanning.

* * * * *